United States Patent [19]

Erikson

[11] Patent Number: 4,802,783
[45] Date of Patent: Feb. 7, 1989

[54] SLEEVE JOINT

[75] Inventor: Magnus Erikson, Johanneshov, Sweden

[73] Assignee: ITT Industries, Inc., New York, N.Y.

[21] Appl. No.: 91,291

[22] Filed: Aug. 27, 1987

Related U.S. Application Data

[63] Continuation of Ser. No. 904,830, Sep. 8, 1986, abandoned, which is a continuation of Ser. No. 672,980, Nov. 19, 1984, abandoned.

[30] Foreign Application Priority Data

Nov. 22, 1983 [SE] Sweden .............................. 8306443

[51] Int. Cl.⁴ .............................................. F16B 3/00
[52] U.S. Cl. ....................................... 403/2; 403/356; 403/375; 403/378
[58] Field of Search ................... 403/2, 356, 355, 358, 403/365, 360, 375, 378; 416/2

[56] References Cited

U.S. PATENT DOCUMENTS

| | | | |
|---|---|---|---|
| 2,456,516 | 12/1948 | Kidney | 403/358 |
| 2,508,832 | 5/1950 | McAninch | 403/355 X |
| 2,748,578 | 6/1956 | Potts | 403/2 X |
| 2,937,042 | 5/1960 | Wilder, Jr. | 403/356 X |
| 3,113,625 | 12/1963 | Conover | 416/2 |
| 3,191,976 | 6/1965 | Arnts et al. | 403/356 X |
| 3,433,512 | 3/1969 | Kraft | 403/355 |
| 3,476,420 | 11/1969 | Conn | 403/361 X |
| 4,348,132 | 9/1982 | Mullenberg | 403/356 |
| 4,604,035 | 8/1986 | Roberts | 403/2 X |

Primary Examiner—Andrew V. Kundrat
Assistant Examiner—Peter M. Cuomo
Attorney, Agent, or Firm—Menotti J. Lombardi

[57] ABSTRACT

A sleeve joint for driving an impeller on a rotatable shaft includes a sleeve positioned between the shaft and the impeller and including at one end a closed groove which is positioned adjacent a corresponding groove in the shaft, the grooves jointly receiving a wedge permitting joint rotation of the shaft and the sleeve, and at the other end a pin for joining the sleeve and the impeller.

1 Claim, 1 Drawing Sheet

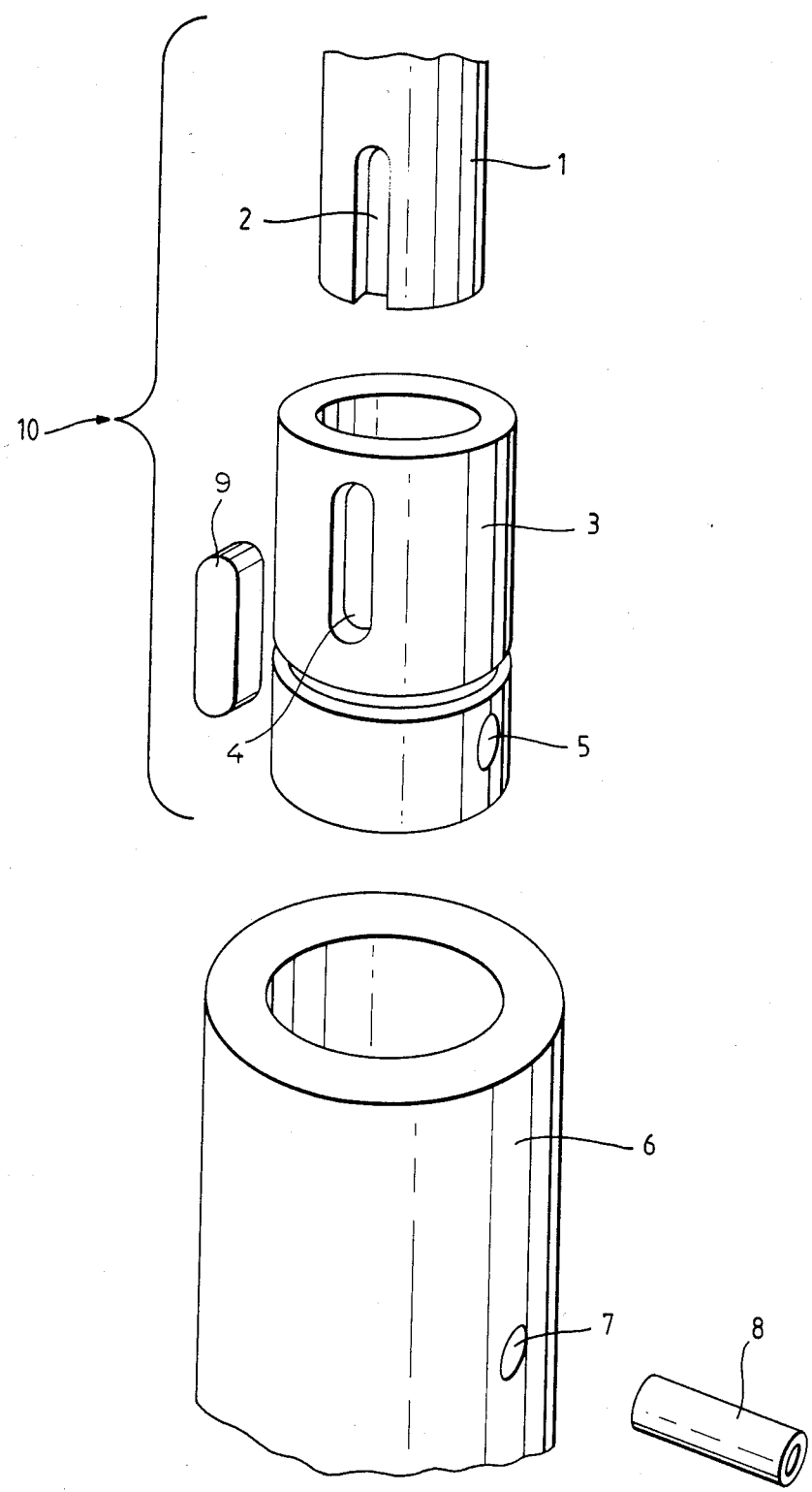

SLEEVE JOINT

This is a continuation of application Ser. No. 904,830, filed Sept. 8, 1986, now abandoned, which was a continuation of application Ser. No. 672,980, filed Nov. 19, 1984, now abandoned.

BACKGROUND OF THE INVENTION

This invention concerns a sleeve joint for joining a driven member on a driving member. More paticularly, the invention is directed to a sleeve joint for driving an impeller on a rotatable shaft.

When driving rotating pump impellers it is often advisable to build in a security device in the joint between the driving shaft and the driven body, which security device is released in case of a sudden stop. This device will diminish the risk of damage to the driving unit and the shaft.

One way of performing this security function is to arrange a driving pin in the joint which will shear upon a sudden stop, letting the shaft rotate freely even when the driven body is stopped. The driving pin is then normally arranged in a hole in the driven body and in a hole in a sleeve on the shaft, the sleeve being driven via a wedge joint positioned in sleeve and shaft. The play between the driven body and the sleeve is then so wide that they are allowed to rotate independently of each other.

This construction often does not work in the expected manner. When the pin has been broken due to the fact the driven body (the impeller) has stopped, the sleeve often splits along the groove, thus eliminating the play between sleeve and the impeller. This means that the driving unit and the driving shaft may be seriously damaged before the electric safety disconnection switch is activated. Frequently the damage resulting is a bent driving shaft.

SUMMARY OF THE INVENTION

According to the invention the problem of ensuring relatively free movement between the sleeve and the impeller when the driving pin is broken is solved by designing the groove in the sleeve as a closed hole.

BRIEF DESCRIPTION OF THE DRAWING

Above-mentioned and other features and objects of this invention will become more apparent by reference to the following description taken in conjunction with the accompanying sole drawing which illustrates an exploded view of the sleeve joint of this invention.

DETAILED DESCRIPTION OF THE PREFERRED EMBODIMENT

In the drawing, a driving unit 10 includes a driving shaft 1 having a groove 2 for receiving a force transmitting member such as a wedge 9 or key. A sleeve 3 has a groove or slot 4 and a hole 5. A driven body 6, also referred to as an impeller, has a hole 7 for a driving pin 8.

The wedge is inserted into the groove 4 and extends into corresponding groove 2 to provide a rotary entraining connection between the shaft 1 and the sleeve 3. The groove 2 is open ended to permit axial displacement of the sleeve 3 and the wedge relative to the driving shaft 1.

The impeller 6 is mounted on the sleeve 3 and locked axially thereon by help of a bolt. The impeller 6, of which a portion of a hub is shown, and the sleeve 3 have the corresponding holes 7 and 5 respectively for the driving pin 8.

Under normal conditions the impeller 6 is attached to the driving unit 10 for rotation therewith and pumping is carried out in the normal way. If the pumped medium contains solid bodies which cause the impeller 6 to encounter substantial resistance or come to a sudden stop, the driving pin 8 will shear and the driving shaft 1 and the sleeve 3 will be allowed to rotate, thus eliminating damage to the driving unit 10 and the shaft 1 provided however, that the sleeve remains undamaged. Sleeves used until now have been provided with open wedge grooves extending to one end of the sleeve, thus having the tendency of splitting along the groove. This means that the play between sleeve 3 and the shaft 1 has been eliminated and corotation occurs. The sleeve 3 according to the invention will, on the contrary, be kept intact thus ensuring free rotation of the shaft 1 and the sleeve 3 relative to the stopped impeller 6.

While I have described above the principles of my invention in connection with specific apparatus, it is to be clearly understood that this description is made only by way of example and not as a limitation to the scope of my invention as set forth in the objects thereof and in the accompanying claims.

We claim:

1. Sleeve joint apparatus for rotary coupling comprising in combination:
   a driven impeller body having a cylindrical portion with a bore and a first aperture therein;
   a unitary formed cylindrical sleeve having first and second end portions and a second aperture positioned adjacent said second end portion for alignment and corresponding with said first aperture, said second end portion of said sleeve being inserted and partially accommodated in said bore of said driven impeller body, and said cylindrical sleeve having a slot adjacent said second end portion and angularly displaced from said second aperture;
   a driving shaft member having a third end portion being inserted and partially accommodated in said first end portion of said sleeve, said driving shaft member having an axially disposed channel for alignment and corresponding with said slot;
   a wedge member for insertion into said slot and channel to form a rotary entraining connection between said driving shaft member and said cylindrical sleeve; and
   a shearable driving pin for inserting into said first and second apertures and securing said driven impeller body and said cylindrical sleeve for rotational movement by said driving shaft member,
   whereby, when said driven impeller body is prevented from rotational movement, said shearable driving pin will shear and said driving shaft member and unitary formed cylindrical sleeve will continue to rotate.

* * * * *